United States Patent
Fujisawa et al.

(10) Patent No.: US 7,278,921 B1
(45) Date of Patent: Oct. 9, 2007

(54) PARTICIPANT SEARCH METHOD IN ONLINE GAME OR ONLINE CHAT, PARTICIPANT SEARCHING DEVICE, PARTICIPANT NETWORK SERVER, NETWORK TERMINAL AND COMPUTER PROGRAM

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 607 days.

(21) Appl. No.: 10/089,840

(22) PCT Filed: Oct. 6, 2000

(86) PCT No.: PCT/JP00/06977

§ 371 (c)(1),
(2), (4) Date: Apr. 4, 2002

(87) PCT Pub. No.: WO01/27771

PCT Pub. Date: Apr. 19, 2001

(30) Foreign Application Priority Data

Oct. 8, 1999 (JP) .................................. 11-288872

(51) Int. Cl.
*A63F 9/24* (2006.01)
*G63F 15/16* (2006.01)
(52) U.S. Cl. .................... 463/42; 709/203; 709/204; 709/217; 709/219
(58) Field of Classification Search .................... 463/1, 463/36, 37, 39–43; 700/90, 91; 709/200–203, 709/217–230, 245, 250; 703/217–230, 245, 703/250
See application file for complete search history.

(56) References Cited

U.S. PATENT DOCUMENTS

| | | | | |
|---|---|---|---|---|
| 5,694,549 A | * | 12/1997 | Carlin et al. ................. | 709/250 |
| 5,737,011 A | * | 4/1998 | Lukacs ........................ | 348/15 |
| 5,764,916 A | * | 6/1998 | Busey et al. ................ | 709/227 |
| 5,793,365 A | * | 8/1998 | Tang et al. .................. | 345/329 |
| 5,827,120 A | * | 10/1998 | Kikuchi et al. ............... | 463/40 |
| 5,905,476 A | * | 5/1999 | McLaughlin et al. ......... | 345/1 |
| 6,370,563 B2 | * | 4/2002 | Murakami et al. .......... | 709/205 |
| 6,401,118 B1 | * | 6/2002 | Thomas ...................... | 709/224 |
| 6,446,112 B1 | * | 9/2002 | Bunney et al. ............. | 709/204 |
| 6,539,099 B1 | * | 3/2003 | Kellner ....................... | 382/103 |
| 6,546,393 B1 | * | 4/2003 | Khan .......................... | 707/10 |
| 6,611,862 B2 | * | 8/2003 | Reisman .................... | 709/217 |
| 6,751,656 B2 | * | 6/2004 | Kohda et al. ............... | 709/219 |

FOREIGN PATENT DOCUMENTS

| | | |
|---|---|---|
| JP | 7-325776 | 12/1995 |
| JP | 11-57215 | 3/1999 |
| JP | 11-253657 | 9/1999 |

* cited by examiner

*Primary Examiner*—Robert E. Pezzuto
*Assistant Examiner*—Travis Banta
(74) *Attorney, Agent, or Firm*—Manabu Kanesaka (57) ABSTRACT

A participant search method in an online game and online chat, wherein, when starting an online game or online chat on a network connecting a plurality of subscribers to each other with a network server as a core, the network server that has received participant search information from one subscriber matches network subscriber-related attribute information stored in the server with the participant search information to select a matched subscriber currently connected to the network, distributes participant recruiting information to that subscriber, and sends back participant acceptance information for the subscriber who has accepted the recruiting information to the above-described one subscriber.

8 Claims, 5 Drawing Sheets

PARTICIPANT SEARCH METHOD IN ONLINE GAME OR ONLINE CHAT, PARTICIPANT SEARCHING DEVICE, PARTICIPANT NETWORK SERVER, NETWORK TERMINAL AND COMPUTER PROGRAM

TECHNICAL FIELD

The present invention relates to a method as well as to a device for searching and processing adversaries, opponents, or partners as participants in a network game or chat making use of the Internet or the like.

BACKGROUND TECHNOLOGY

In an online game enjoyed by participants through a network, different from an offline game, as adversaries are generally at remote sites, it is very difficult to search the adversaries. Namely in the online game, although the adversary is a man, at present a means for making it possible to easily find out an adversary is not available, so that a participant in a game depends on promise with his or her friend or accidental encounter in a chat room or the like in finding the adversary for the game.

In Japanese Patent Laid-Open Publication No. HEI 9-164271, a network game system making it possible to smoothly shift from ordinary communications to those for an action game is disclosed. With the network communication game system, it is possible to easily find out an adversary from a broad area by using the ordinary communications, but it is required to find out the adversary at random with a complicated means of dialogue using letters by activating a game device and a chat device each time it is tried to start a game.

Japanese Patent Laid-Open Publication No. HEI 11-57215 discloses a network game system for playing a game match among an unspecified number of participants on a communication network comprising a server device having a user information storage means for storing therein information for a plurality of participants, a game match requirement response means for differentiating, upon receipt of a requirement for a game match, users having transmitted the requirement for game match from other users as that queuing a match, and a player selection processing means for deciding a combination of users having been differentiated as those in queue for a game; and a client device having a game match requirement means for outputting the requirement for a game match to the server device.

In the network game system described above, the player selection means in the server device automatically selects players for a game, so that the work to be performed by a player to select an adversary for the game is not required, which improves the convenience a little. The client device constituting the network game system also comprises a player requirement means for outputting a requirement for a game to the server device and also for receiving the player requirement transmission timing information specifying timing for transmitting a requirement for a player from the server device; and a player requirement means for outputting, at the timing specified by the player requirement transmission timing information, the requirement for a player to the server device and also for receiving information for the player from the server device, so that the client device can process the information for specifying the timing in selection of a player, but can not start the game immediately like in an offline game.

An object of the present invention is to provide the capability of starting a game immediately at any time like in an offline game by automating search for a game player (or a participant in chat) in an online game or an online chat system, especially in an online game played by participants who are online users.

DISCLOSURE OF THE INVENTION

The participant search method in an online game or in an online chat system according to the present invention is characterized in that, when a online game or an online chat system is started in a network to which a plurality of subscribers is connected with a network server as a core, the network server which receives the participant search information from one subscriber collates attribute information for network subscribers stored in the server to the participant search information, selects subscribers who match the attribute information and are now being connected to the network, distributes participant recruiting information to the subscribers, and returns the participation acceptance information for the subscribers who accepted the recruiting information.

The present participant search device used in an online game or an online chat system provided in a network to which a network server and a plurality of network terminals are connected is characterized in that the network server comprises a subscriber attribute information storage section for storing therein attribute information for network subscribers, an ID storage section for storing therein IDs for the subscribers, a participant selection section for selecting matched subscribers from the subscriber attribute information storage section in response to a requirement for starting a game or chat, and a log-in monitoring section for managing a relation between an ID and an IP address of each of currently logged-in subscribers and a channel, and also in that the network terminal has an ID retaining section for retaining an ID assigned to the terminal from the network server, and an IP recording section for temporally recording an IP address assigned, when connected to the online network, from a provider in which each subscriber subscribed until connection to the online system is disconnected.

The network terminal preferably comprises an ID storage section for selecting candidates for ID exchange from network subscribers and storing the subscribers IDs therein.

A program for a network server to search a participant in an online game or an online chat system according to the present invention comprises the steps of receiving participant search information from a subscriber connected to a network, collating attribute information for network subscribers stored in the server to the participant search information, selecting the subscribers matching the subscriber attribute information and currently connected to the network, distributing participant recruiting information to the subscriber, and returning the participant acceptance information for the subscriber having accepted the recruiting information to the subscriber.

BEST MODE FOR CARRYING OUT THE INVENTION

A preferred embodiment of the processing for searching an adversary in an online game is described below with reference to the related drawings.

Figure 1:
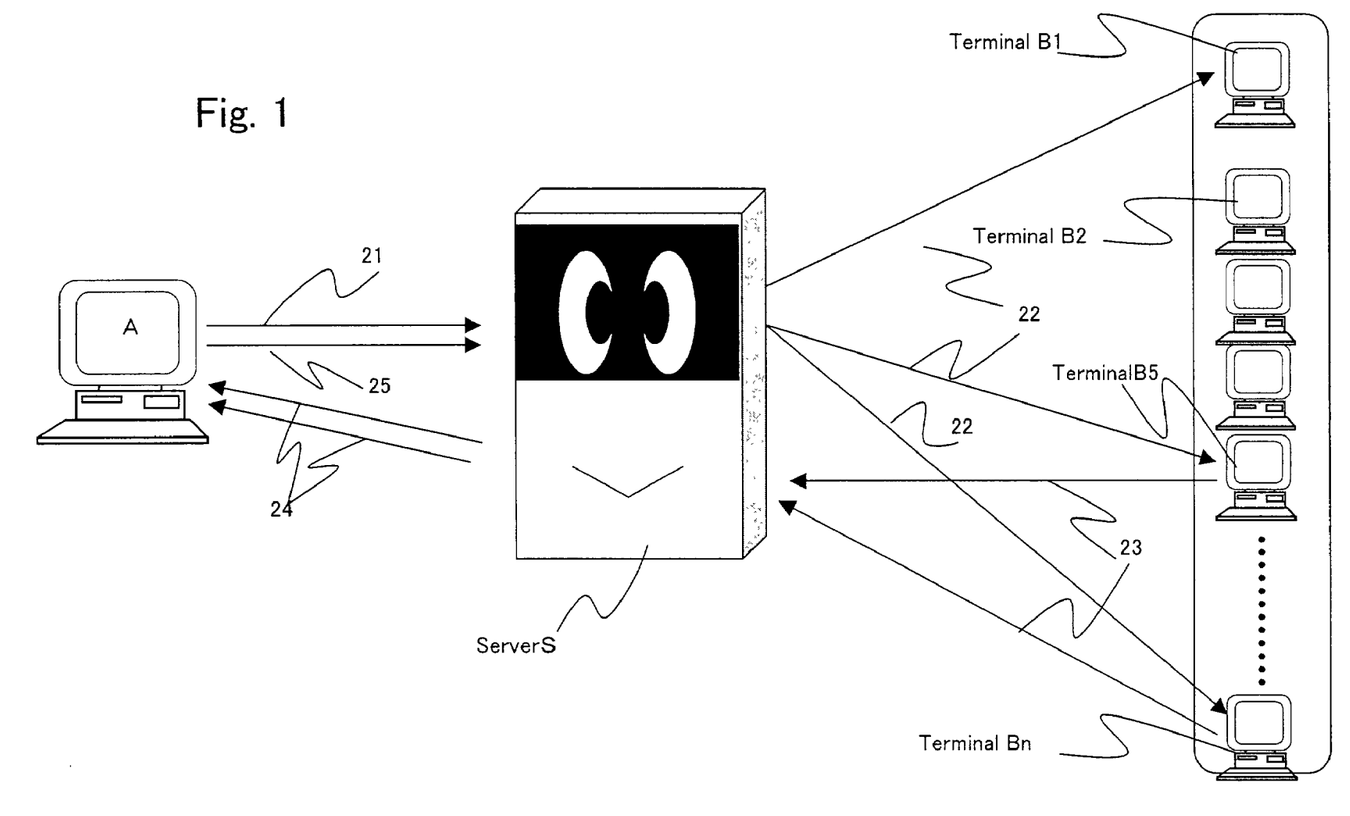
FIG. 1 is an explanatory view showing general configuration of a device and a method according to the present invention.
Figure 2:
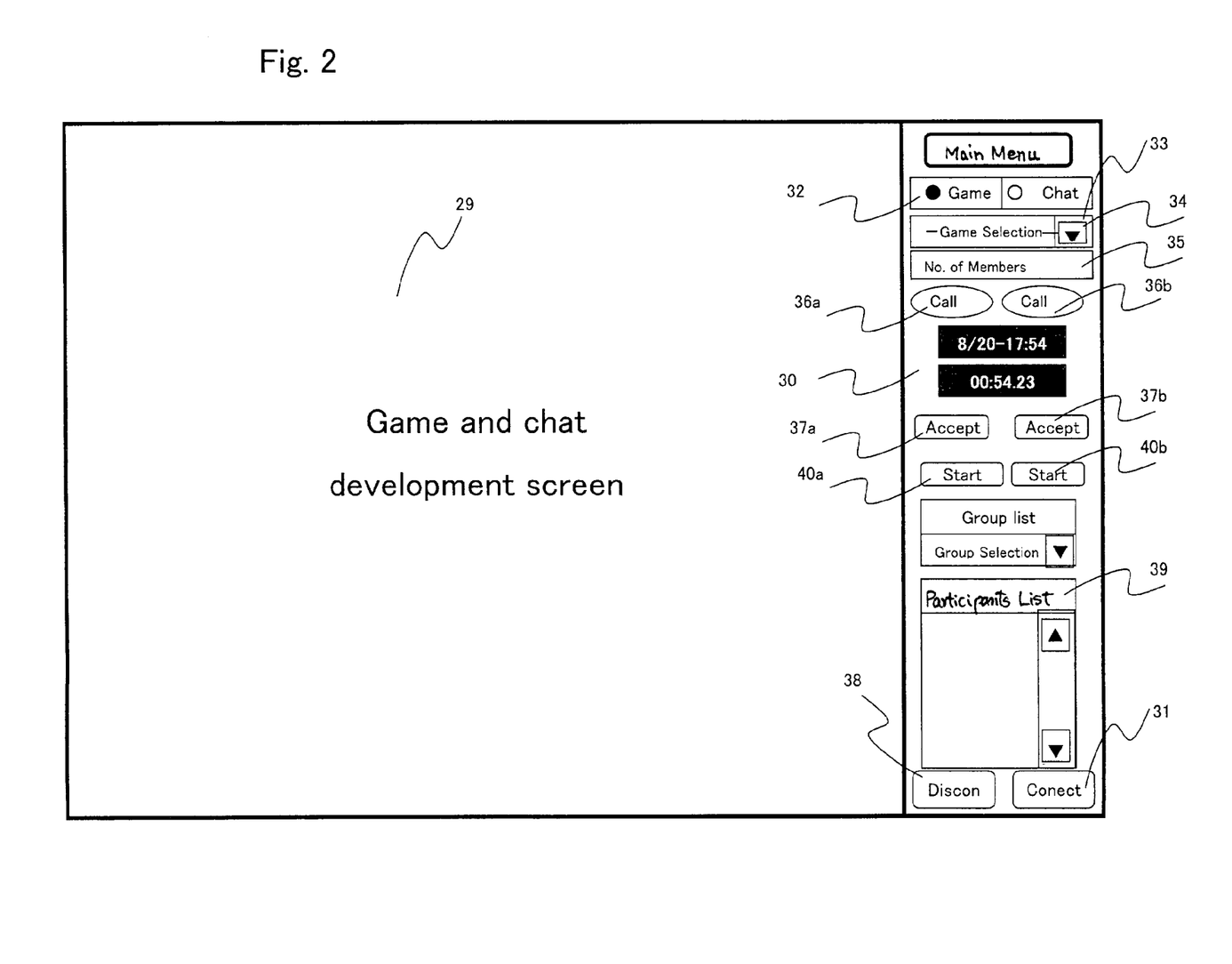
FIG. 2 is an example of a default screen at a terminal A.
Figure 3:
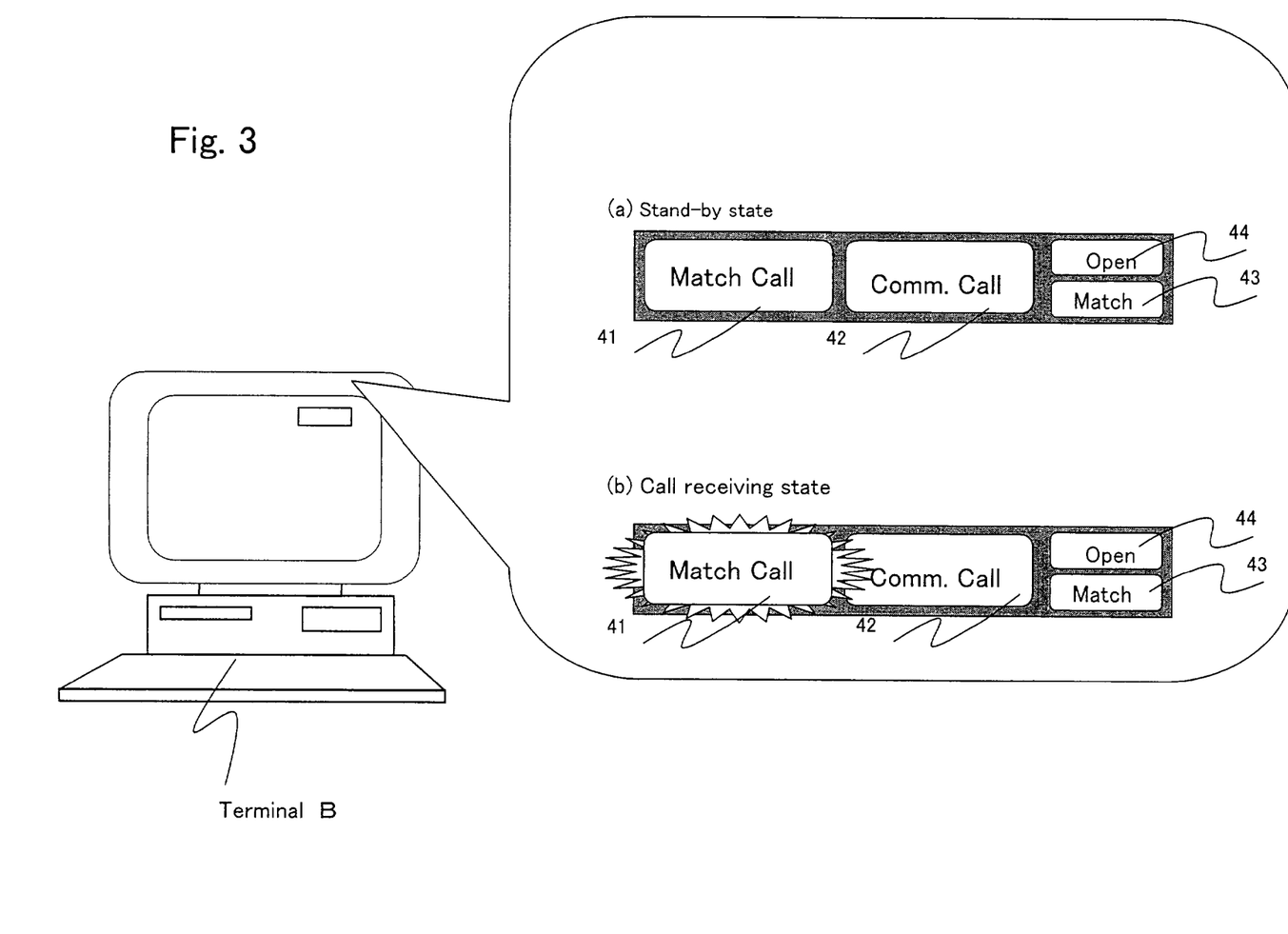
FIG. 3 is an example of a display screen showing a window for the stand-by state (a) and the call receiving state (b) at a terminal B.

FIG. 1 is an explanatory view showing general configuration of a device and a method according to the present invention, and FIG. 2 and FIG. 3 show examples of a display screen at a network terminal. In FIG. 1, the terminal A and terminal $B_1$, terminal $B_2$, ... terminal $B_5$, ... terminal $B_n$ are connected respectively through a network to a network server S. Therefore, the terminal A and terminal $B_1$, terminal $B_2$, ... terminal $B_5$, ... terminal $B_n$ are network game clients, and it is assumed in the following description that the terminal A is of a subscriber who spontaneously expresses a hope to enjoy the online game and his or her will to start the game, namely match demander, and that the terminal $B_1$, terminal $B_2$, ... terminal $B_5$, ... terminal $B_n$ are of other network subscribers, namely potential participants in the online game.

FIG. 2 is a preferable default start-up screen at the terminal A, and various types of operation buttons and a pull-down menu are shown on a control screen shown in the right hand side on the default screen, and a development screen 29 for a game or chat is displayed in the entire left hand side portion of the default screen.

At first, the match demander clicks on a connection button 31 on the default screen to connect the demander's terminal through a network to the network server S. Then to set conditions for the adversary, the demander selects a game selection radio button 32 between the game selection radio button 32 and a chat selection radio button 33 to open a game selection pull-down menu 34 for selecting a desired game not shown in the figure. Then the demander inputs a number of the demanders team members in an input column 35 for a number of the demanders team members (Note that this operation is not required in a one versus one game), and clicks on an adversary call button 36a. It is needless to say that, in a case of a game in which a team comprising a plurality of members plays a game with another team also comprising a plurality of members, the demanders team members have been decided at this timing.

The operation described above is a requirement for setting conditions for searching an adversary in an online game, and when a counterpart for chatting is searched, the demander selects the chat selection radio button 33 and then clicks a chat call button 36b. The reference numeral 37b indicates a chat acceptance button having the same function as a match acceptance button 37a described below, while the reference numeral 40b indicates a chat start button having the same function as a game start button 40a described below.

When the adversary call button 36a is clicked, an adversary search signal 21 including the adversary search information such as a type of a game to be played is prepared, and the signal 21 is transmitted from the terminal A to the network server S. In the network server S, a subscriber or subscribers satisfying the set conditions in the attribute information for taste for a game or the like registered by the network subscribers in entry or in the attribute information for a skill ranking or points and a rank in each game or the like updated or added from time to time and also currently connected to the network are selected. Then the network server S transmits an adversary recruiting signal 22 including data for the game type described above, set conditions such as a number of team members, and a message previously prepared (such as, for instance, "an adversary for the game XXXX is required") to the terminals B for potential adversaries for the online game. FIG. 1 shows that the recruiting signal 22 has been transmitted to the terminal $B_1$, terminal $B_5$, and terminal $B_n$ respectively.

The terminal B also has the same control screen 30 as that in the terminal A, and displays the screen 29 for a game or chatting described above or the screen for the stand-by state (a) shown in FIG. 3, and when the recruiting signal 22 is received, a match call button 41 flickers, and the screen for the call receiving state (b) shown in FIG. 3 is displayed. It should be noted that, in FIG. 3, the reference numeral 42 indicates a call button flickering when the terminal B receives the recruiting signal 22 for chatting.

In the terminal B, when an open button 44 is clicked, the screen for the call receiving state (b) shown in FIG. 3 is switched to the development screen 29 and the control screen 30 shown in FIG. 2. Then, when a subscriber for hoping participation in the game at the terminal B clicks on the match acceptance button 37a, the terminal B transmits a match acceptance signal 23 including the match acceptance information to the network server S. Upon reception of the acceptance signal 23, the network server S transmits an adversary selection signal 24 including the attributes information for a net name, a skill ranking, and others previously registered therein and the IP address information previously registered therein to the terminal A. FIG. 1 shows that the acceptance signals 23, 23 have been transmitted from the terminal $B_5$ and the terminal $B_n$ respectively and then the selection signals 24, 24 have been transmitted to the terminal A through the server S.

A participant list 39 showing subscribers having expressed their hope to participate in the game is shown in a list form on the control screen 30 of the terminal A having received the selection signal 24, and then the match demander double-clicks on a net name shown in the participant list 39, takes into considerations the attribute information displayed in response to above clicking now shown in the figure, selects a desired adversary from those shown in the participant list 39, and presses a game start button 40a to wait for start of the game. As described above, with the method according to the present invention, the match demander can immediately search for an adversary or adversaries for the game through the simple operation described above.

Figure 4:
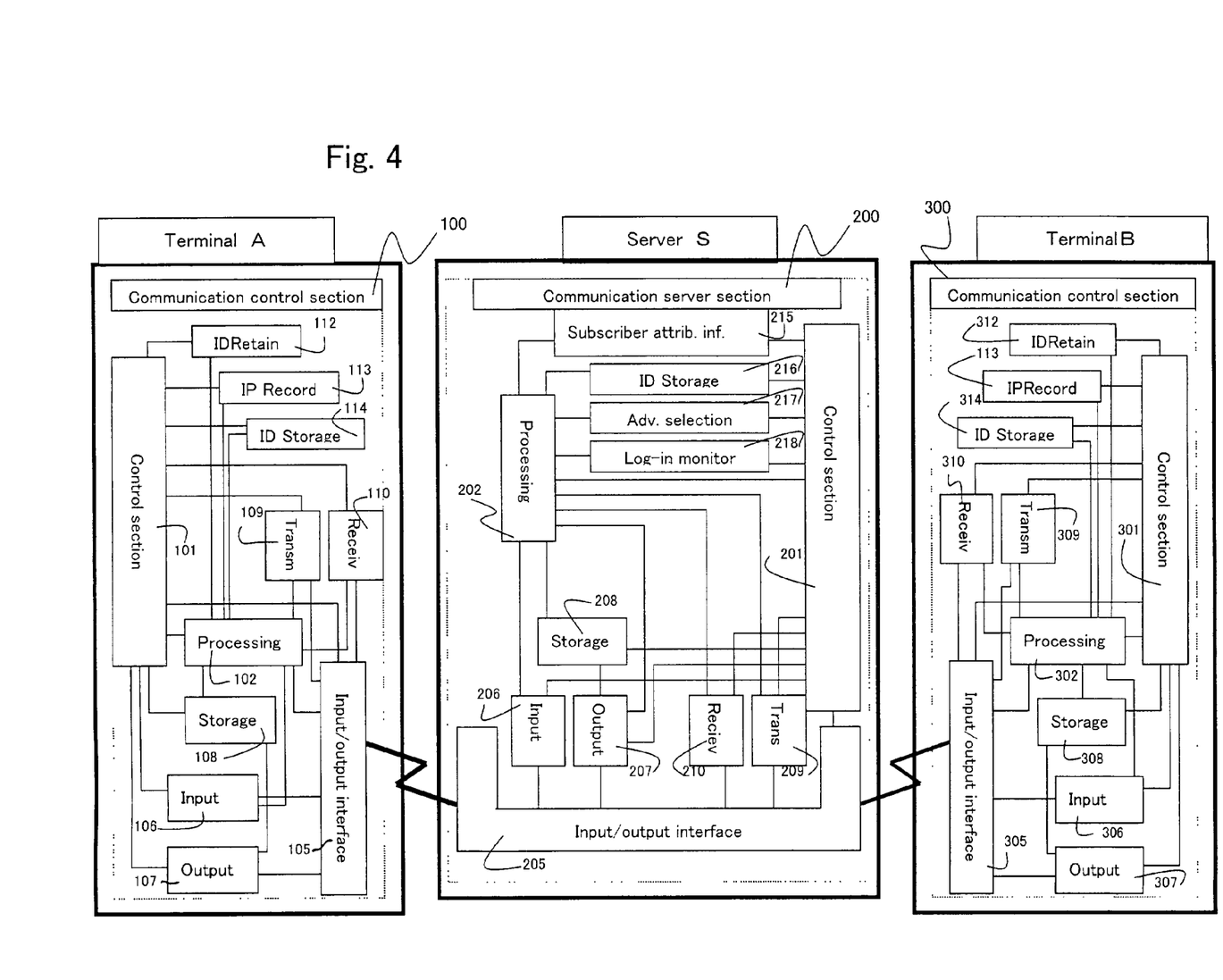
FIG. 4 is a block diagram showing configuration of an adversary automatic search processor.

FIG. 4 is a block diagram showing basic configuration of the adversary search processor, and a communication control section 100, a communication server section 200, and a communication control section 300 each constituting the match search processor according to the present invention are shown at each of the terminal A, network server S, and terminal B. In addition to the components described above, a game control section and a game server section required for playing the game are provided to the terminal A, terminal B, and network server S respectively.

Each of the communication control section 100, communication server 200, and communication control section 100 has functional sections for executing the ordinary functions to be performed by each section. The functional sections include the control sections 101, 201, 301 for controlling operations of the sections 100, 200, and 300 respectively, processing sections 102, 202, and 302 for processing data stored in each section, input/output interfaces 105, 205, 305 connected to various types of input/output peripheral devices not shown in the figure as well as to the network, input sections 106, 206, 306 for receiving data from the input/output interface sections 105, 205, 305 respectively, output sections 107, 207, 307 for outputting data, storage sections 108, 208, 308 for storing data therein, transmission sections 109, 209, 309 for transmitting communication data, and receiving sections 110, 210, 310 for receiving communication data.

The communication control sections 100, 300 of the terminal A and terminal B have, in addition to the functional sections for executing the ordinary functions to be performed by each section, ID retaining section 112, 312 for retaining therein IDs assigned to subscribers from the network server S, and IP recording sections 113, 313 for temporally recording therein IP addresses assigned in the online mode from a provider to which each subscriber subscribes until execution of the offline processing respectively. Further the communication control sections 100, 300 should preferably have ID storage sections 114, 314 for selecting candidates for ID exchangers from the network subscribers and storing therein the subscribers' IDs in the respectively terminals.

The communication server section 200 has, in addition to the functional sections for executing the ordinary functions to be performed by the section, a subscriber attribute information storage section 215 for storing therein attribute information for all of the subscribers (such data as names, sex, hobbies, each subscriber's own games, and highest scores), an ID storage section 216 for storing therein IDs of all subscribers, an adversary selection section 217 for selecting an adversary or adversaries from the candidates, attribute information of which are stored in the subscriber attribute information storage section 215 in response to a request from a subscriber hoping to start playing a game, and a log-in monitoring section 218 for managing a relation between an ID and IP address of logging-in subscriber and the channel.

An automated adversary search method by the search processor is described below.

In the communication control section 100 at the terminal A, information for conditions such as selection of a game or chatting, a name of a specified game, a number of team members or the like entered from the input/output interface 105 is sent via the input section 106 to the processing section 102 according to an instruction by the control section 101 and is stored in the storage section 108. Then the self IP address of the subscriber stored in the IP recording section 113 and acquired upon the current connection and the information stored in the storage section 108 are subjected to processing in the processing section 102 and sent to the transmission section 109 according to an instruction from the control section 101, and are transmitted as an adversary search signal 21 to the communication server section 200 in the network server S through the network as a medium from the input/output interface 105.

The information included in the search signal 21 is sent to the receiving section 210 in the communication server section 200 via the input/output interface 205, subjected to processing in the processing section 202 according to an instruction by the control section 201, and then is stored in the storage section 208. Based on the search information and the information stored in the subscriber attribute information storage section 215, and also according to an instruction from the control section 201, the adversary selection section 217 selects data concerning candidates for the adversary or adversaries. Namely, only an inter-field collation between the search information and the information stored in the subscriber attribute information storage section 215 is required to be performed in the adversary selection section 217, and by setting parameters in this step, flexible response can be performed regardless of whether a number of subscribers currently logging-in is large or small.

On the other hand, the log-in monitoring section 218 in the communication server section 200 always monitors subscribers currently logging-in in the network. The processing for determination in the log-in monitoring section 218 is described with reference to FIG. 5.

Figure 5:
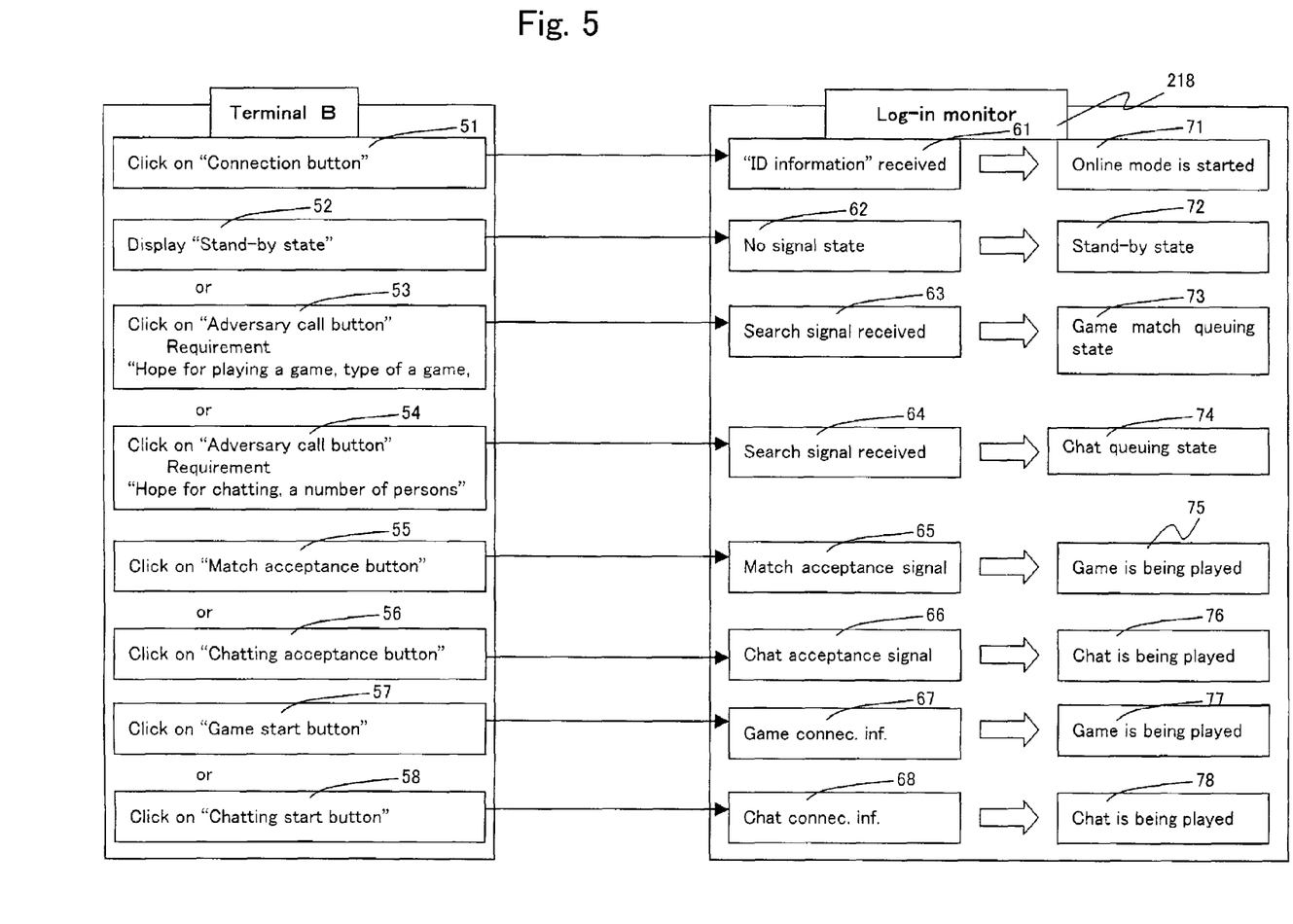
FIG. 5 is a flow chart showing a process for determination in a log-in monitoring section 218.

In FIG. 5, the reference numerals 50 to 59 indicate operating states of control buttons in the terminal B. The reference numerals from 60 to 69 indicate types of signals which the log-in monitoring section 218 receives in response to operations of the button, and the reference numerals from 70 to 79 indicate contents of determination performed based on the signals in the log-in monitoring section 218.

For instance, when an operator of the terminal B clicks on the connection button 31 on the control screen 30 shown in FIG. 2 (operation 51), the ID information is transmitted to the server S, and the log-in monitoring section 218 determines that the received ID information 61 is online start 71. In this state, when the adversary search signal 21 from another subscriber is received in the server S, it is determined that playing the game at the terminal B is impossible. In operations 52 to 58 at the terminal B, the respective signals are transmitted similarly, and the determinations 72 to 78 are made based on the received signals 62 to 68 in the log-in monitoring section 218. Namely in the determinations 71, 73, 75, and 77, it is determined that playing the game at the terminal B is impossible, while, in the determinations 72, 74, 76, and 78, it is determined that playing the game at the terminal B is possible. Although not shown in the figure, when the disconnection button 38 is clicked on the control screen 30, a network disconnection signal is transmitted from the terminal, while the server S makes determination on the disconnected state and the terminal is excluded from an object for the determination function.

Status of each of the terminals B currently connected to the server S is identified through the determination processing in the log-in monitoring section 218, and candidate(s) for an adversary or adversaries are extracted. It is expected that a number of terminals always connected to the network will increase in the future, but in that case, a number of terminals in the queuing state as shown in FIG. 3 (*a*) increases, and processing in the log-in monitoring section 218 having a function for identifying the queuing terminals will become indispensable.

Data for the candidates for an adversary or adversaries is collated to the log-in data in the log-in monitoring section 218, and appropriate data for the candidates currently logging-in is screened out and transmitted to the transmission section 209. The transmission section 209 transmits, according to an instruction from the control section 201, to the IP address on the network included in each data, the adversary recruiting signal 22 from the input/output interface 205 to the network. It should be noted that the IP address is collated to the subscriber ID stored in the ID storage section 216.

The adversary recruiting signal 22 is processed in the processing section 302 according to an instruction from the control section 301 transmitted via the receiving section 310 from the input/output interface 305 in the communication control section 300 at the terminal B corresponding to the IP address, and is stored in the storage section 308. The recruit signal 22 is sent via the input/output interface 305 to a terminal display section not shown in the figure, and a network name in the participant list 39 shown in FIG. 2 is lit for display ("new" is displayed when the specified network name has not been registered in the terminal B). In a case of the stand-by state (b), as shown in FIG. 3, the match call button 41 flickers for display.

When a subscriber having checked the display above hopes to participate in the game, and recognizes that the current screen of the subscriber's terminal is the development screen 29 for a game or chatting as shown in FIG. 2, the subscriber clicks on the match acceptance button 37, and when the current screen is the stand-by screen shown in FIG. 3, the subscriber clicks on an instant match button 43. As a result, in the terminal B, the current IP address from the IP recording section 313 and the subscriber ID from the ID retaining section 312 are transferred and processed by the processing section 302 according to an instruction from the control section 301, and then are sent to the transmission section 309. Then, according to an instruction from the control section 301 in the terminal B, the match acceptance signal 23 including the information described above is transmitted from the input/output interface 305 through the network to the communication server section 200.

The match acceptance signal 23 entered the receiving section 210 from the input/output interface 205 in the communication server section 200 is transferred to the processing section 202 according to an instruction from the control section 201. The processing section 202 sends the data together with those stored in the subscriber attribute information storage section 215 to the transmission section 209, and again transmits the data as an adversary selection signal 24 via the input/output interface 205 through the network to the terminal A.

The adversary selection signal 24 enters the receiving section 110 via the input/output interface 105 in the terminal A, and is processed in the processing section 102 according to an instruction from the control section 101 to be stored a subscriber ID included in the selection signal 24 in the ID storage section 114. At the same time, the selection signal 24 is sent via the storage section 108, output section 107, and input/output interface 105 to a display section, not shown in the figure, of the terminal A, and is displayed as the net name in the participant list 39 as shown in FIG. 2.

At this point of time, the match demander at the terminal A clicks twice on the net name, selects a desired adversary from among a plurality of adversaries by taking into considerations the candidates' attribute or other information displayed on another window, presses the game start button 40a, and stands by for start of the game. When the game start button 40a is pressed, a game start signal 25 is generated in the terminal A, and this start signal 25 passes through the input/output interfaces 105, 205 and enters the receiving section 210 in the communication server section 200. The start signal 25 is sent to the log-in monitoring section 218 by the processing section 202 according to an instruction from the control section 201 and is monitored until a terminate signal is received from the terminal A.

The processing functions of the communication control sections 100, 300 and the communication server section 200 can be recorded as a processing program in a computer-readable recording medium such as a CD-ROM, or a DVD-ROM.

With the participant search processing method according to the present invention, search for a participant or participants is automated when starting an online game or online chatting, so that search for participant(s) is extremely simplified. In a case of an offline game, it is possible to start the game immediately at any time, so that this method is most suited to an online game in which two or more players participate.

With the participant search processor according to the present invention, a demander searching an adversary or adversaries for a game or chatting can easily and immediately find out the adversary or adversaries through simple operations.

The invention claimed is:

1. A method of searching a participant or participants in an online game or online chatting, comprising:
providing, to each of a group of subscribers, an ID retaining section for retaining an ID to be assigned from a network server, an IP recording section for temporally recording an IP address assigned, when connected to a network, from a provider in which each subscriber subscribes until connection to the network is disconnected, a transmission section to the server, and a control section connected to the ID retaining section, the IP recording section and the transmission section,
receiving participant search information from one of the subscribers in starting the online game or online chatting on the network to which a plurality of subscribers is connected with the network server as a core, said network server having a log-in monitoring section;
managing a channel and a relation between the ID and the IP address of all of the subscribers currently logging-in by the server;
collating attribute information concerning the subscribers stored in the server in response to the participant search information by the server;
selecting subscribers other than the one of the subscribers satisfying the participant search information in all the subscribers currently connected to the network by the server;
distributing participant recruiting information to the selected subscribers by the server;
upon acceptance to the participant recruiting information, transferring an IP address and an ID of an accepted subscriber through the transmission section to the server;
returning the participation acceptance information of the accepted subscriber to the one of the subscribers by the server; and
sending a start signal from the one of the subscribers to the log-in monitoring section, said log-in monitoring section monitoring until a termination signal is received from the one of the subscribers.

2. A participant search device used for an online game or online chatting performed on a network to which a network server and a plurality of network terminals are connected, wherein each of the network terminals comprises an ID retaining section for retaining an ID to be assigned from the network server, an IP recording section for temporally recording an IP address assigned, when connected to the network, from a provider in which each subscriber subscribes until connection to the network is disconnected, a transmission section to the server, and a control section connected to the ID retaining section, the IP recording section and the transmission section, the IP address in the IP recording section and the ID in the ID retaining section in at least one of the subscribers being transferred to the server, upon receiving and acceptance to participant recruiting information, through the transmission section, and wherein said network server comprises:
a subscriber attribute information storage section for storing attribute information for network subscribers;
an ID storage section for storing therein IDs of the subscribers;
a participant selection section for selecting subscribers satisfying conditions specified in a request from another of the subscribers with the attribute information stored in the subscriber attribute information storage section;
a transmission section for transmitting the participant recruiting information to the selected subscribers connected to the network;
a control section for receiving a start signal from the another of the subscribers after the another of the subscribers receives the acceptance of the participant recruiting information from at least one of the subscribers, and starting an operation, and
a log-in monitoring section for receiving the start signal through the transmission section of the server and managing a relation between the ID and the IP address of all of the subscribers currently logging-in and a channel until a termination signal is received from the one of the subscribers.

3. A network server having a communication server section for searching a participant or participants in an online game or online chatting, wherein the communication server section comprises:
a subscriber attribute information storage section for storing therein attribute information for network subscribers;
an ID storage section for storing therein subscribers' IDs;
a participant selection section for selecting the subscribers satisfying the attribute information having been stored in the subscriber attribute information storage section in response to a demand from another of the subscribers;
a transmission section for transmitting participant recruiting information to the selected subscribers connected to a network;
a control section for receiving a start signal from another of the subscribers after the another of the subscribers receives acceptance of the participant recruiting information from at least one of the subscribers, and starting an operation, and
a log-in monitoring section for managing a relation between an ID and an IP address of all of the subscribers currently logging-in and a channel until a termination signal is received from the one of the subscribers.

4. A computer program for a network server embedded in a computer readable medium for searching a participant or participants in an online game or online chatting comprising the steps of:

retaining an ID to be assigned from a network server in each of a group of subscribers;
temporally recording an IP address in each of the subscribers, said IP address being assigned, when connected to a network, from a provider in which each subscriber subscribes until connection to the network is disconnected;
managing a channel and a relation between the ID and the IP address of all of subscribers currently logging-in;
receiving participant search information from one of the subscribers connected to the network in starting the online game or online chatting on the network to which a plurality of the subscribers is connected with the network server as a core;
collating the participant search information to attribute information for the network subscribers stored in the server and selecting other subscribers currently connected to the network;
distributing participant recruiting information to the other subscribers connected to the network;
transferring the IP address and the ID in another of the subscribers to the server, upon acceptance to the participant recruiting information by the another of the subscribers;
returning the participation acceptance information for the another of the subscribers to the one of the subscribers; and
sending a start signal from the one of the subscribers to a log-in monitoring section of the server, said log-in monitoring section monitoring until a termination signal is received from the one of the subscribers.

5. The method of searching according to claim 1, wherein said managing the channel and the relation includes managing a channel and a relation between servers.

6. The computer program according to claim 4, wherein said managing the channel and the relation includes managing a channel and a relation between servers.

7. The method of searching a participant or participants according to claim 1, wherein search for the participant or participants is automated when starting the online game or online chatting.

8. The computer program according to claim 4, wherein search for the participant or participants is automated when starting the online game or online chatting.

* * * * *